July 6, 1937.  W. L. BARR  2,086,061
GATE
Filed Jan. 21, 1937  2 Sheets-Sheet 1
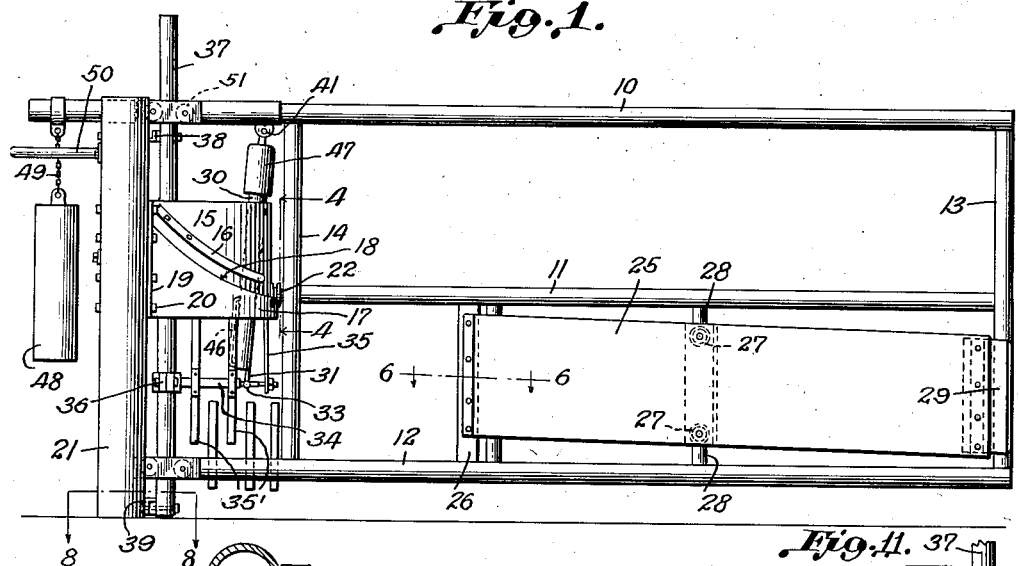
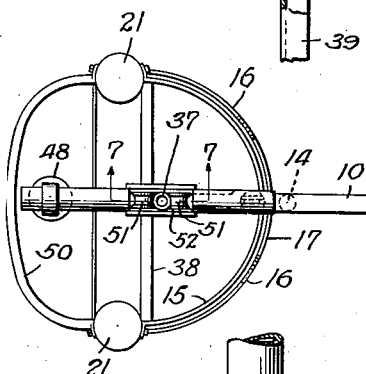
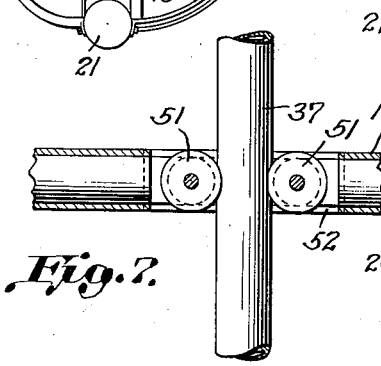
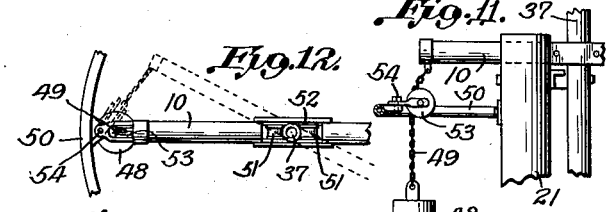
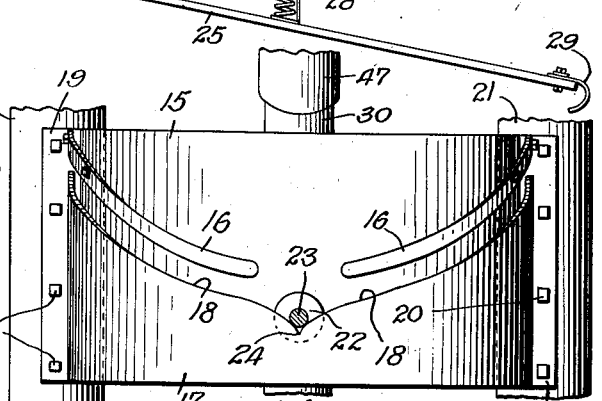
W. L. Barr.
INVENTOR
BY Victor J. Evans & Co.
ATTORNEYS July 6, 1937.  W. L. BARR  2,086,061
GATE
Filed Jan. 21, 1937  2 Sheets-Sheet 2
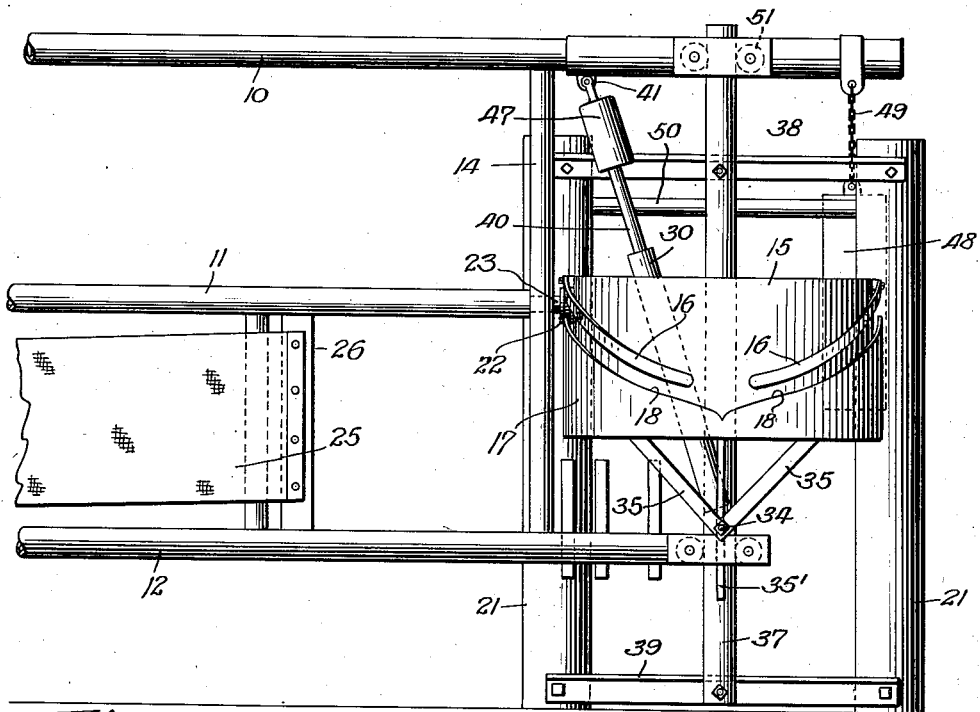
Fig. 3.
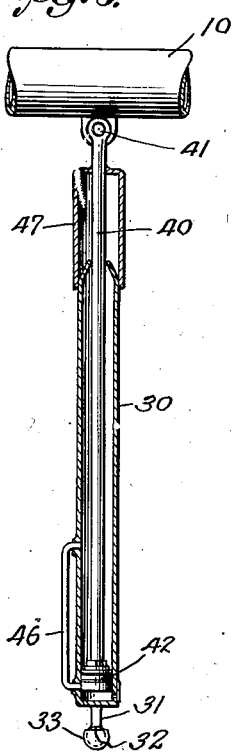
Fig. 5.
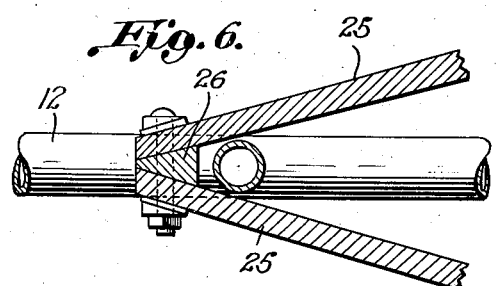
Fig. 6.
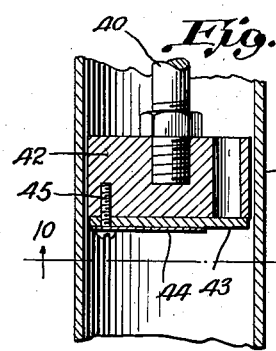
Fig. 9.
Fig. 10.
W. L. Barr.
INVENTOR
BY Victor J. Evans & Co.
ATTORNEYS Patented July 6, 1937

2,086,061

UNITED STATES PATENT OFFICE 2,086,061

GATE

Willie L. Barr, San Angelo, Tex.

Application January 21, 1937, Serial No. 121,690

2 Claims. (Cl. 39—22)

This invention relates to gates and has for an object to provide a gate which may be pushed open by advance of a vehicle and will return by gravity to closed position after the vehicle passes through.

A further object of the invention is to provide a gate of this character having a novel cam means for raising the gate while it is being swung open.

A further object is to provide a gate of this character having a novel hydraulic cylinder for retarding closing movement of the gate to permit of the vehicle passing safely without being struck by the gate.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a front elevation of a gate constructed in accordance with the invention and shown closed.

Figure 2 is a plan view of the gate shown in Figure 1.

Figure 3 is a side elevation of the gate shown in open position.

Figure 4 is a detail cross sectional view taken on the line 4—4 of Figure 1 drawn to an enlarged scale.

Figure 5 is a detail longitudinal sectional view of the hydraulic cylinder.

Figure 6 is a detail sectional view taken on the line 6—6 of Figure 1.

Figure 7 is a detail sectional view taken on the line 7—7 of Figure 2.

Figure 8 is a fragmentary cross sectional view taken on the line 8—8 of Figure 1.

Figure 9 is a detail sectional view of the ported piston in the hydraulic cylinder.

Figure 10 is a detail cross sectional view taken on the line 10—10 of Figure 9.

Figure 11 is a fragmentary elevation of a modified form of the invention showing means for stabilizing the weight in a blustery locality.

Figure 12 is a plan view of the parts shown in Figure 11.

Referring now to the drawings in which like characters of reference designate similar parts in the various views, a gate is shown comprising horizontally disposed longitudinal bars 10, 11 and 12 connected at the outer ends by a vertical bar 13 and connected together near the hinged end by a vertical bar 14. The intermediate longitudinal bar 11 is shorter than the upper and lower bars 10 and 12 to permit an arcuate sheet metal cam plate 15 being received between the upper and lower bars and the inner vertical bar 14 as best shown in Figure 1.

The cam plate 15 is formed of a semi-cylindrical blank of sheet metal having secured thereto a pair of downwardly extending arcuate guide bars 16, best shown in Figure 2. A sheet metal plate 17 is secured to the plate 15 below the guide bars 16 and the upper edge thereof is formed with arcuate downwardly curved cam edges 18 which conform to the curvature of the guide bars 16. The guide bars and the plate 17 having the cam edges 18 are spaced from the plate 15. The plate 15 is provided with out-turned flanges 19 which are bolted, as shown at 20, to gate supporting posts 21 spaced on opposite sides of the gate.

A guide roller 22 is mounted to idle on a shaft 23 that is carried by the vertical bar 14 and longitudinal intermediate bar 11. The guide roller rides upwardly on the cam edges 18 of the plate 17 when the gate is being opened and during such opening movement the guide bars 16 are received in the groove of the guide roller. When the gate is pushed open by an approaching vehicle, the guide roller 22 rides to the upper end of the track formed by the cam edges 18 and guide bars 16 thereby raising the gate vertically. When the vehicle has safely passed through the gate the gate gravitates and during such movement the guide roller 22 rides downward on the track and when the gate is completely closed the guide roller comes to rest in normal position in a notch 24 formed at the low ends of the cam edges 18, as best shown in Figure 4.

A pair of bumper plates 25 are secured at the inner ends to a short wedge shaped bar 26 which is secured to the intermediate and lower longitudinal bars 11 and 12 of the gate. The plates diverge outwardly and are yieldably held in spaced relation by helical springs 27 which have their inner ends seated against a short vertically disposed bar 28, as best shown in Figure 2. The free ends of the plates are provided with rubber flaps 29 which prevent marring of the vehicle while in contact with the bumper plates when opening the gate.

Closing movement of the gate is retarded by a hydraulic cylinder 30, best shown in Figure 5.

The hydraulic cylinder is provided with a lug 31 on the bottom which terminates in a ball 32 that is received in a socket 33 carried on the end of a stationary arm 34, best shown in Figure 1. The arm is braced at its free end by inclined braces 35 and vertical braces 35' that are connected to the cam plate 15, as best shown in Figure 3. The opposite end of the arm is provided with a ring 36 which is fixed to a stationary post 37. The post is anchored to the gate supporting posts 21 by means of upper and lower angle brackets 38 and 39. The piston rod 40 of the hydraulic cylinder is pivotally connected at the upper end to the upper longitudinal bar 10 of the gate, as shown at 41 in Figure 5, and is equipped at the lower end with a conventional ported piston 42 having a leather flap valve 43. A metal rib 44 is secured to the piston by a screw 45 and forces the flap valve to seat against the piston.

As the piston moves upwardly when the gate is being opened oil or other medium may escape through the ported piston so that the gate will open freely without obstruction. When the gate is gravitating and simultaneously swinging to closed position the oil escapes through the clearance space between the cylinder and the loosely fitted piston so that closing movement of the gate is retarded to permit the vehicle to pass safely through the gate.

A by-pass 46 is disposed in the cylinder near the bottom thereof so that when the piston reaches a point near the bottom of the cylinder, during closing movement of the gate, the oil may escape from underneath the piston through the by-pass to a point above the piston and thus permit the gate to close quickly since during final stages of closing movement slow closing is not necessary.

A cylindrical shield 47 is disposed on the piston rod near the upper end thereof to prevent access of dust and other foreign matter to the cylinder. For steadying the gate against high winds a weight 48, best shown in Figure 1, is suspended from the upper longitudinal bar 10 of the gate by means of a chain 49. An arcuate guard rail 50 is secured to the gate supporting posts 21 and prevents swaying of the weight during opening and closing movements of the gate.

For facilitating raising and lowering of the gate on the stationary post 37 roller bearings 51, best shown in Figures 2 and 3, are mounted in recesses 52 in the upper and lower longitudinal bars 10 and 12 of the gate. These rollers serve to guide the gate smoothly and evenly during raising and lowering as well as swinging movement.

For stabilizing the weight in windy, blustery localities a pulley 53 is mounted to swing on a pivot 54 disposed at the center of the arcuate guard rail 50. The chain 49 of the weight 48 is trained over this pulley so that when the gate swings to the dotted line position shown in Figure 12 the weight will be drawn upwardly but will always remain at the center of the guard rail instead of moving laterally or being allowed to swing freely.

Since the operation of the gate has been described as a description of the parts progressed it is thought that the construction and operation of the invention will be fully understood without further explanation.

What is claimed is:

1. The combination with a gate, of diverging bumper plates secured to the gate intermediate the ends thereof and extending to the free end of the gate, cushion material on the end edges of the plates for preventing marring of a vehicle advancing against the bumper plates, gate supporting posts on opposite sides of the gate, an arcuate cam member bridging the posts, arcuate upwardly directed tracks on the cam member, the lowest point in the tracks forming a seat, a roller carried by the gate normally engaged in said seat and movable upwardly and downwardly on the tracks during respectively opening and closing of the gate, a stationary post intermediate the gate supporting posts, and a hydraulic cylinder connected to the stationary post and to the gate for retarding closing movement of the gate.

2. The combination with a swinging gate adapted to be pushed open by a vehicle, of supporting posts on opposite sides of the gate, an arcuate cam member bridging the posts and interfitting with the gate structure, spaced upwardly directed diverging tracks on the cam member, a roller carried by the gate engaging said tracks to raise and lower the gate during swinging movement thereof, a stationary post intermediate the gate supporting posts, an arm fixed to the stationary post, a hydraulic cylinder connected to the post and to the arm and means between the cylinder and gate adapted to retard closing movement of the gate.

WILLIE L. BARR.